(12) United States Patent
van der Merwe (10) Patent No.: US 8,374,775 B2
(45) Date of Patent: Feb. 12, 2013

(54) ADAPTIVE SENSOR-BASED ACTIVITY CLASSIFICATION

(75) Inventor: Rudolph van der Merwe, Portland, OR (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 12/613,438

(22) Filed: Nov. 5, 2009

(65) Prior Publication Data

US 2011/0106418 A1     May 5, 2011

(51) Int. Cl.
*G01C 21/10*     (2006.01)
*G01C 21/12*     (2006.01)

(52) U.S. Cl. ........ 701/408; 701/400; 701/500; 702/141; 702/179

(58) Field of Classification Search ........................ None
See application file for complete search history.

(56) References Cited

U.S. PATENT DOCUMENTS

| | | | |
|---|---|---|---|
| 5,602,761 A * | 2/1997 | Spoerre et al. ................ 702/179 |
| 6,597,738 B1 * | 7/2003 | Park et al. ................ 375/240.16 |
| 6,813,582 B2 * | 11/2004 | Levi et al. ................ 702/141 |
| 6,826,477 B2 * | 11/2004 | Ladetto et al. ................ 701/472 |
| 6,940,407 B2 | 9/2005 | Miranda-Knapp et al. |
| 7,143,001 B2 * | 11/2006 | Karasek ................ 702/141 |
| 7,196,661 B2 | 3/2007 | Harvey |
| 7,310,593 B2 * | 12/2007 | Hammerschmidt .......... 702/189 |
| 7,463,997 B2 * | 12/2008 | Pasolini et al. ................ 702/160 |
| 7,486,174 B2 * | 2/2009 | Battista et al. ............. 340/425.5 |
| 7,508,419 B2 | 3/2009 | Toyama et al. |
| 7,640,134 B2 * | 12/2009 | Park et al. ................ 702/141 |
| 7,813,892 B2 * | 10/2010 | Sugawara et al. ............. 702/160 |
| 7,911,329 B2 * | 3/2011 | Battista et al. ............. 340/425.5 |
| 7,979,207 B2 * | 7/2011 | Chowdhary et al. .......... 701/479 |
| 2007/0005246 A1 | 1/2007 | Kappi |
| 2009/0132197 A1 | 5/2009 | Rubin et al. |

OTHER PUBLICATIONS

R. van der Merwe, E. Wan, and S. Julier, "Sigma-Point Kalman Filters for Nonlinear Estimation and Sensor-Fusion: Applications to Integrated Navigation," *Proceedings of the AIAA Guidance Navigation & Control Conference*, 2004.
S. van Gerven and F. Xie, "A comparative study of speech detection methods," Eurospeech, pp. 1095-1098, 1997.
T. Moon, "The expectation-maximization algorithm," *IEEE Signal processing magazine*, vol. 13, No. 6, pp. 47-60, 1996.
H. Robbins and S. Monro, "A Stochastic Approximation Method," *The Annals of Mathematical Statistics*, vol. 22, pp. 400-407, 1951.
G. McLachlan and T. Krishnan, *The EM Algorithm and Extensions*, Wiley—New York, Chapters 1.5 and 5.5, 1997.
H. Akaike, "A new look at the statistical model identication," IEEE Transactions on Automatic Control, vol. 19, No. 6, pp. 716-723, 1974.

* cited by examiner

*Primary Examiner* — Michael J. Zanelli
(74) *Attorney, Agent, or Firm* — Fish & Richardson P.C.

(57) ABSTRACT

An activity state (e.g., stationary or moving) of an intermittently moving mobile device is classified using sensor measurements provided by one or more on-board sensors. The activity state can be determined by a classifier that exploits the separable log-normal distributions of the short-time variance of sensor measurements. The activity state can provide an external non-correlated indication of movement or stationarity to an on-board navigation engine. The on-board navigation engine can use the activity state to improve tracking performance.

22 Claims, 9 Drawing Sheets

ADAPTIVE SENSOR-BASED ACTIVITY CLASSIFICATION

TECHNICAL FIELD

This subject matter is related generally to location aware mobile devices.

BACKGROUND

Some modern mobile devices contain a variety of sensors that provide useful dynamic information about the current state of the device. For example, some devices include a Global Position System (GPS) receiver that provides high accuracy three dimensional location measurements in real-time for use by applications (e.g., map services). Some devices include a three axis accelerometer that measures linear acceleration within a local inertial frame and a three axis magnetometer. The main purpose of the accelerometer and magnetometer is to provide device orientation measurements (e.g., pitch, roll and yaw angles).

Another use of these sensors, however, is to augment the location (e.g., geodetic position) solution provided by the GPS receiver. The complexity, fidelity and computational cost of such an augmentation system can vary greatly. A complete integrated inertial navigation system (INS) solution uses a model driven probabilistic approach that fuses available sensor measurements to provide real-time navigation solutions (e.g., position, velocity, attitude). Another solution is to use ancillary sensor data (e.g., accelerometer and magnetometer data) that can be processed outside of the GPS receiver to generate navigation hints (e.g., the user is stationary, the user is moving, the user is turning). The hints can be exploited by the GPS receiver to further fine-tune its own internal processing (e.g., tune noise models) for more accurate navigation solutions.

SUMMARY

An activity state (e.g., stationary or moving) of an intermittently moving mobile device is classified using sensor measurements provided by one or more on-board sensors. The activity state can be determined by an activity classifier that exploits the separable log-normal distributions of the short-time variance of sensor measurements. The activity state can provide an external non-correlated indication of movement or stationarity to an on-board navigation engine (e.g., GPS receiver). The on-board navigation engine can use the activity state to improve its tracking performance.

DETAILED DESCRIPTION

Figure 1:
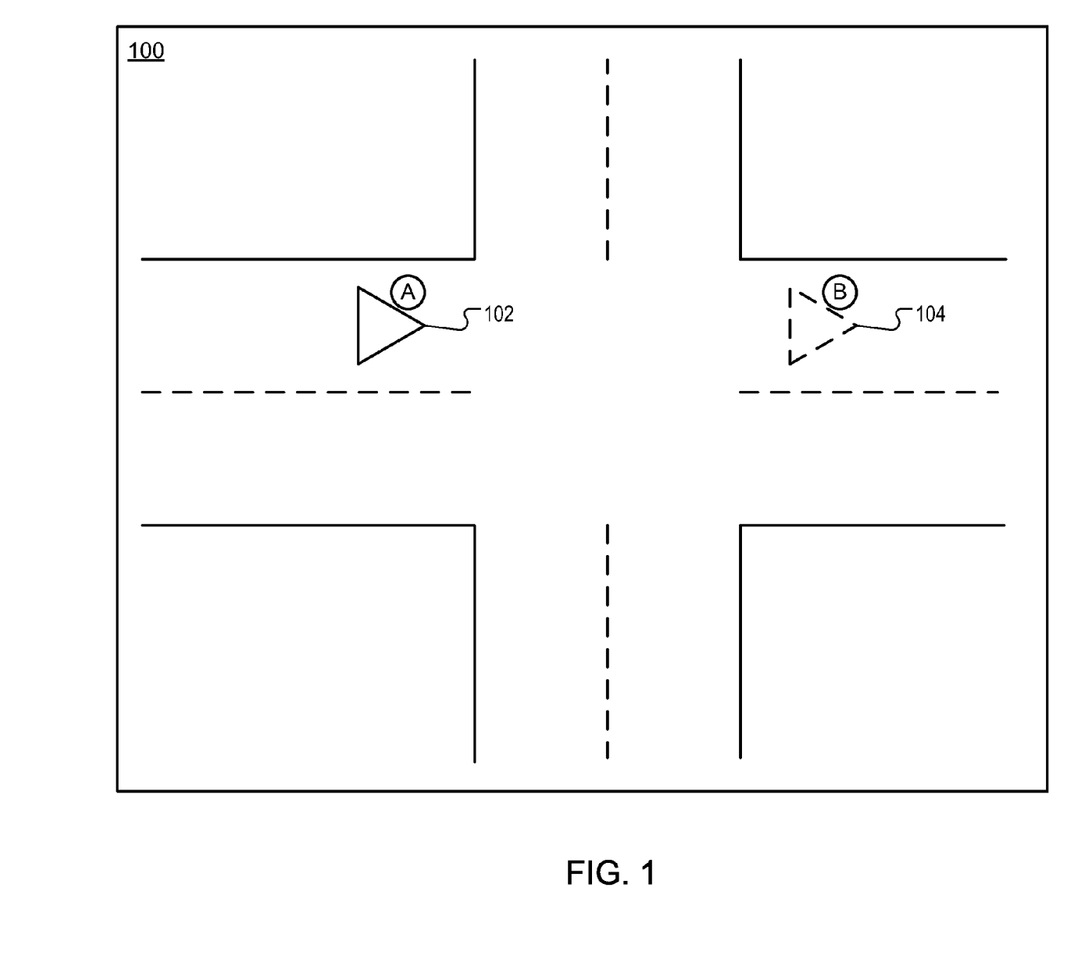
FIG. 1 illustrates location determination inaccuracy associated with conventional navigation systems.

FIG. 1 illustrates location determination inaccuracy associated with conventional navigation systems. In the example shown, navigation display 100 displays location marker 102, marking an accurate estimated location (location A) of a mobile device. Location marker 104 shown on navigation display 100 marks an inaccurate estimated location (location B) of the mobile device. Location B is inaccurate due to an inaccurate navigation solution. An inaccurate navigation solution can result from a variety of factors, including but not limited to: an insufficient number of satellites available, poor satellite geometry, multi-path signals from nearby buildings or objects, etc. One or more of these factors can result in an inaccurate navigation solution which can manifest itself on navigation display 100 as location marker 104. Such inaccuracies can result in a poor user experience with a conventional navigation system.

System Overview

Figure 2:
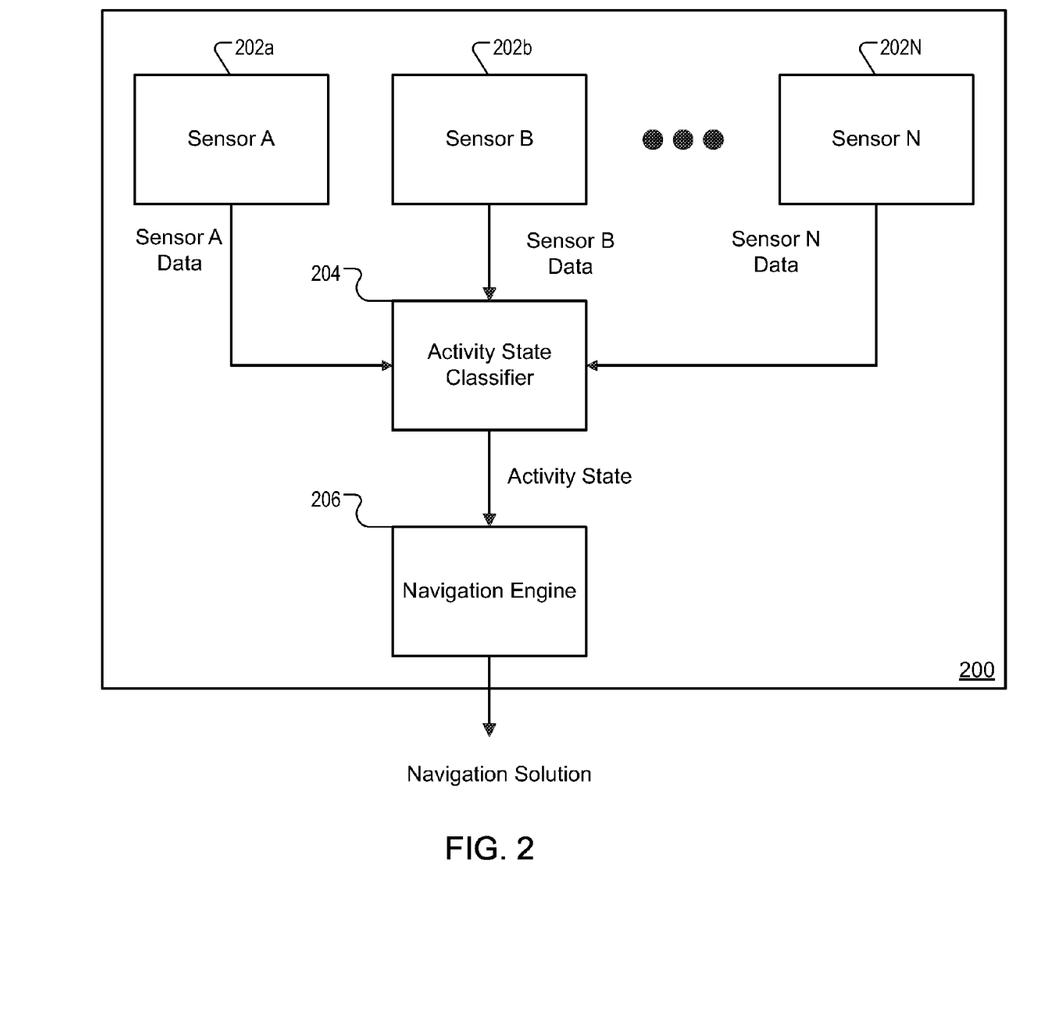
FIG. 2 is a block diagram of an example system for determining activity states.

FIG. 2 is a block diagram of an example system 200 for determining activity states. In some implementations, system 200 can include one or more sensors 202, activity state classifier 204 and navigation engine 206. Some examples of sensors can include but are not limited to: accelerometers, gyroscopes, magnetometers, light sensors, vibration sensors, audio sensors, proximity sensors, etc.

The one or more sensors 202 provide output that is received by classifier 204. For example, an accelerometer sensor can provide raw or processed acceleration data and a gyroscope or magnetometer can provide raw or processed orientation information.

The combination of sensor outputs can be analyzed by classifier 204, and an activity state can be generated as output of classifier 204. In some implementations, the sensor outputs can be compared with reference data (e.g., a database) to determine an activity state for the mobile device. In some implementations, the sensor outputs can be normalized, scaled or otherwise formatted prior to the comparison with reference data. The activity state can include data that describes the activity state (e.g., moving, stationary, turning) for the mobile device. Generally, an activity state can be any data that indicates or describes an activity state of a mobile device. For example, activity state can be a simple flag or binary value, or one or more bytes or words of digital data depending on the amount of detailed information generated by classifier 204.

System 200 will now be described in the context of an example scenario. In this scenario, a user has approached a street intersection and is operating a navigation system, as shown in FIG. 1. When the user stops at location A, accelerometer output can be checked by classifier 204 to determine whether the mobile device has stopped. For example, if the accelerometer output (after factoring out acceleration due to Earth's gravitational field) indicates no acceleration or movement (except for some noise), classifier 204 can generate an activity state that indicates that the mobile device has stopped. Additionally, magnetometer or gyroscope data can be analyzed to determine whether the mobile device is turning or rotating. For example, if the magnetometer or gyroscope output indicates no rotation or rotation rate (except for possibly some noise), classifier 204 can generate an activity state that indicates that the mobile device is not turning.

In some implementations, context data can be used directly by navigation engine 206 to compute a navigation solution or modify a navigation solution previously computed by navigation engine 206 without use of an activity state. For example, an activity state can include one or more parameters that can be used directly, or with some modification, by a navigation algorithm (e.g., a Kalman filter, extended Kalman filter, sigma-point Kalman filter, sequential Monte-Carlo methods, particle filters, etc.). In some implementations, an activity state can be input to a GPS receiver, where the state can be used by a Kalman filter to modify or weight GPS and sensor measurements to provide an overall optimal navigation solution that is more accurate then using a GPS solution alone.

In some implementations, GPS and INS data (e.g., accelerometers, gyroscopes) can be processed by a discrete, linear Kalman filter, extended Kalman filter, sigma-point Kalman filter, or other methods such as sequential Monte-Carlo methods, particle filters, etc. The GPS data can be taken as external measurement input and the INS data can be taken as additional information to the Kalman filter's state prediction.

Example Mobile Device Architecture

Figure 3:
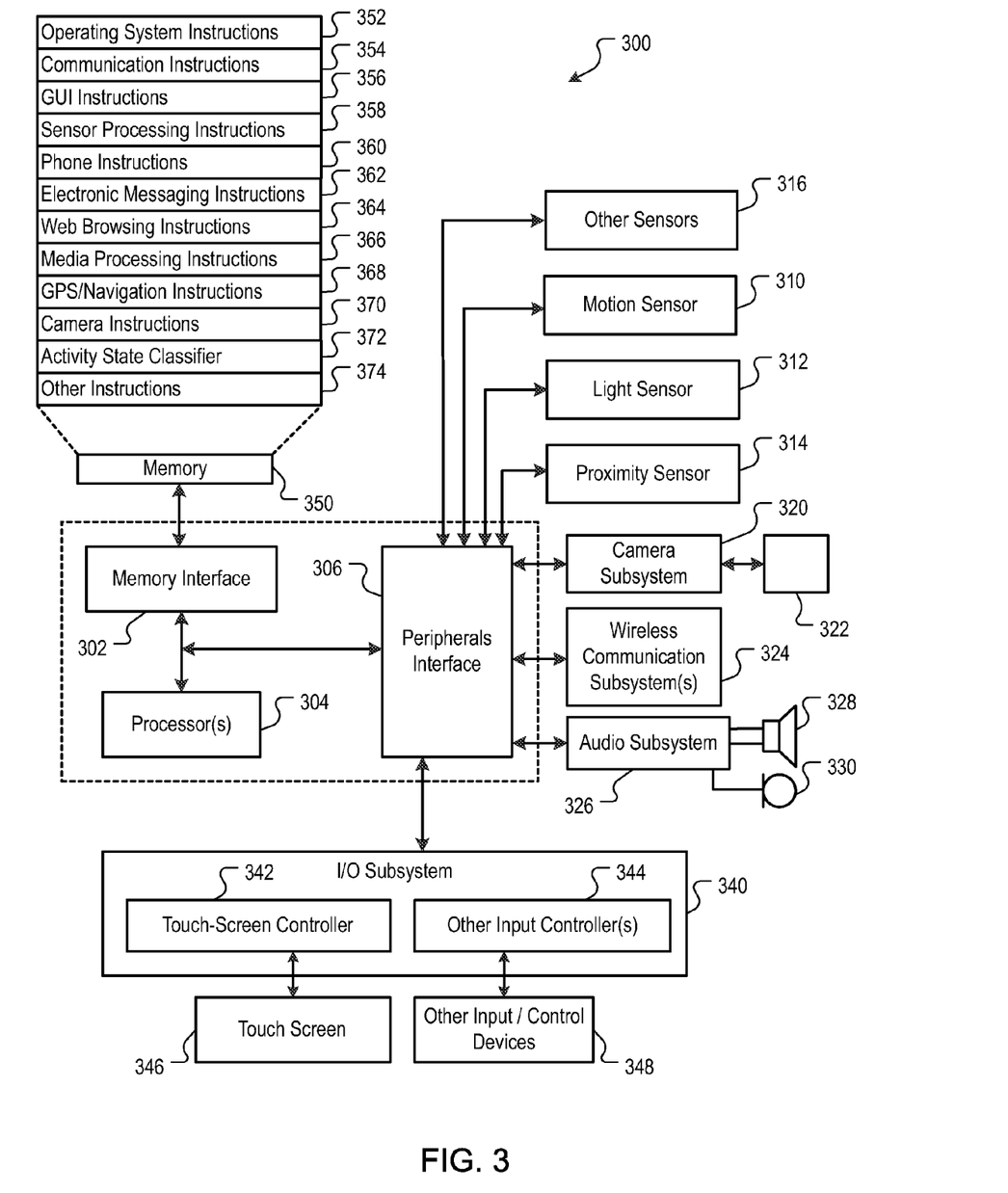
FIG. 3 is a block diagram of an example architecture of a mobile device capable of determining activity states.

FIG. 3 is a block diagram of an example architecture 300 of a mobile device capable of providing activity states. The device can include memory interface 302, one or more data processors, image processors and/or central processing units 304, and peripherals interface 306. Memory interface 302, one or more processors 304 and/or peripherals interface 306 can be separate components or can be integrated in one or more integrated circuits. The various components in the device can be coupled by one or more communication buses or signal lines.

Sensors, devices, and subsystems can be coupled to peripherals interface 306 to facilitate multiple functionalities. For example, motion sensor 310, light sensor 312, proximity sensor 314 can be coupled to peripherals interface 306 to facilitate orientation, lighting, and proximity functions. Other sensors 316 can also be connected to peripherals interface 306, such as a positioning system (e.g., GPS receiver), a temperature sensor, a biometric sensor, magnetometer, FM or satellite radio, or other sensing device, to facilitate related functionalities.

Camera subsystem 320 and optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of communication subsystem 324 can depend on the communication network(s) over which the device is intended to operate. For example, the device may include communication subsystems 324 designed to operate over a GSM network, a GPRS network, an EDGE network, a WiFi or WiMax network, and a Bluetooth™ network. In particular, wireless communication subsystems 324 may include hosting protocols such that the device may be configured as a base station for other wireless devices.

Audio subsystem 326 can be coupled to speaker 328 and microphone 330 to facilitate voice-enabled functions, such as voice recognition, voice replication, digital recording, and telephony functions.

I/O subsystem 340 can include touch screen controller 342 and/or other input controller(s) 344. Touch-screen controller 342 can be coupled to touch screen 346 or a touch pad. Touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 346.

Other input controller(s) 344 can be coupled to other input/control devices 348, such as one or more buttons, rocker switches, thumb-wheel, infrared port, USB port, and/or a pointer device such as a stylus. One or more buttons (not shown) can include an up/down button for volume control of speaker 328 and/or microphone 330.

In one implementation, a pressing of the button for a first duration may disengage a lock of touch screen 346; and a pressing of the button for a second duration that is longer than the first duration may turn power to the device on or off. The user may be able to customize a functionality of one or more of the buttons. Touch screen 346 can, for example, also be used to implement virtual or soft buttons and/or a keyboard. In addition to touch screen 346, the device can also include a touch pad.

In some implementations, the device can present recorded audio and/or video files, such as MP3, AAC, and MPEG files. In some implementations, the device can include the functionality of an MP3 player, such as an iPod™. The device may, therefore, include a connector that is compatible with the iPod™. Other input/output and control devices can also be used.

Memory interface 302 can be coupled to memory 350. Memory 350 can include high-speed random access memory and/or non-volatile memory, such as one or more magnetic disk storage devices, one or more optical storage devices, and/or flash memory (e.g., NAND, NOR). Memory 350 can store an operating system 352, such as Darwin, RTXC, LINUX, UNIX, OS X, WINDOWS, or an embedded operating system such as VxWorks. Operating system 352 may include instructions for handling basic system services and for performing hardware dependent tasks. In some implementations, operating system 352 can be a kernel (e.g., UNIX kernel).

Memory 350 may also store communication instructions 354 to facilitate communicating with one or more additional devices, one or more computers and/or one or more servers. Memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions (e.g., navigation engine 206); camera instructions 370 to facilitate camera-related processes and functions; and activity state classifier 372 and other instructions 374 to facilitate the processes and functions described in reference to FIGS. 2-9. Memory 350 may also store other software instructions (not shown), such as web video instructions to facilitate web video-related processes and functions; and/or web shopping instructions to facilitate web shopping-related processes and functions. In some implementations, media processing instructions 366 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 350.

Each of the above identified instructions and applications can correspond to a set of instructions for performing one or more functions described above. These instructions need not be implemented as separate software programs, procedures, or modules. Memory 350 can include additional instructions or fewer instructions. Furthermore, various functions of the device may be implemented in hardware and/or in software, including in one or more signal processing and/or application specific integrated circuits.

Adaptive Sensor-Based Activity Classification

In some implementations, an adaptive sensor-based activity classifier can be used to determine an activity state of a mobile device. The disclosed adaptive process is based on the observation that a histogram of the logarithm of a short-time averaged energy of accelerometer measurements of an intermittently moving device has a bimodal distribution. This short-time log-variance signal is given by $$l(n) = 10 log_{10}\left(\frac{1}{N}\sum_{k=0}^{N-1}(a_x(n-k)-\mu_x)^2 + \frac{1}{N}\sum_{k=0}^{N-1}(a_y(n-k)-\mu_y)^2 + \frac{1}{N}\sum_{k=0}^{N-1}(a_z(n-k)-\mu_z)^2\right),$$ [1]

where $a_x(n)$, $a_y(n)$ and $a_z(n)$ are the linear accelerometer measurements at time n along the x, y, z axes of a local inertial coordinate frame, respectively. We assume here that the signals are sampled at a constant sampling rate $F_s=(\Delta T)^{-1}$. In [1] above, N is the window length (in samples) over which the signal variance is calculated. For window length of τ seconds, $$N = \frac{\tau}{\Delta T}.$$

The terms log-variance and log-energy refer to the same quantity, l(n) as given in [1].

The short-time signal mean values, $\mu_x$, $\mu_y$, $\mu_z$, are given by $$\mu_x = \frac{1}{N}\sum_{k=0}^{N-1}a_x(n-k),$$ [2]

$$\mu_y = \frac{1}{N}\sum_{k=0}^{N-1}a_y(n-k),$$ [3]

$$\mu_z = \frac{1}{N}\sum_{k=0}^{N-1}a_z(n-k).$$ [4]

The calculations in [1], [2], [3] and [4] are for a three axis accelerometer sensor that measures linear acceleration within x, y, z axes of a local inertial coordinate frame. However, the processes described below can be adapted to other sensors, such as gyros and magnetometers.

The log-variance signal as calculated by [1] has a number of attractive characteristics. By combining the different axial measurements of the accelerometer into a single non-directional quantity, orientation invariance can be achieved. This is particularly important since the orientation of the device relative to the vehicle (or person carrying it) is usually unknown. Further, the local variance calculations automatically remove the local mean value of the signal. This automatically discounts the large effect of the gravity acceleration vector on the measurement, and also normalizes for other unknown biases in the signal.

Figure 4:
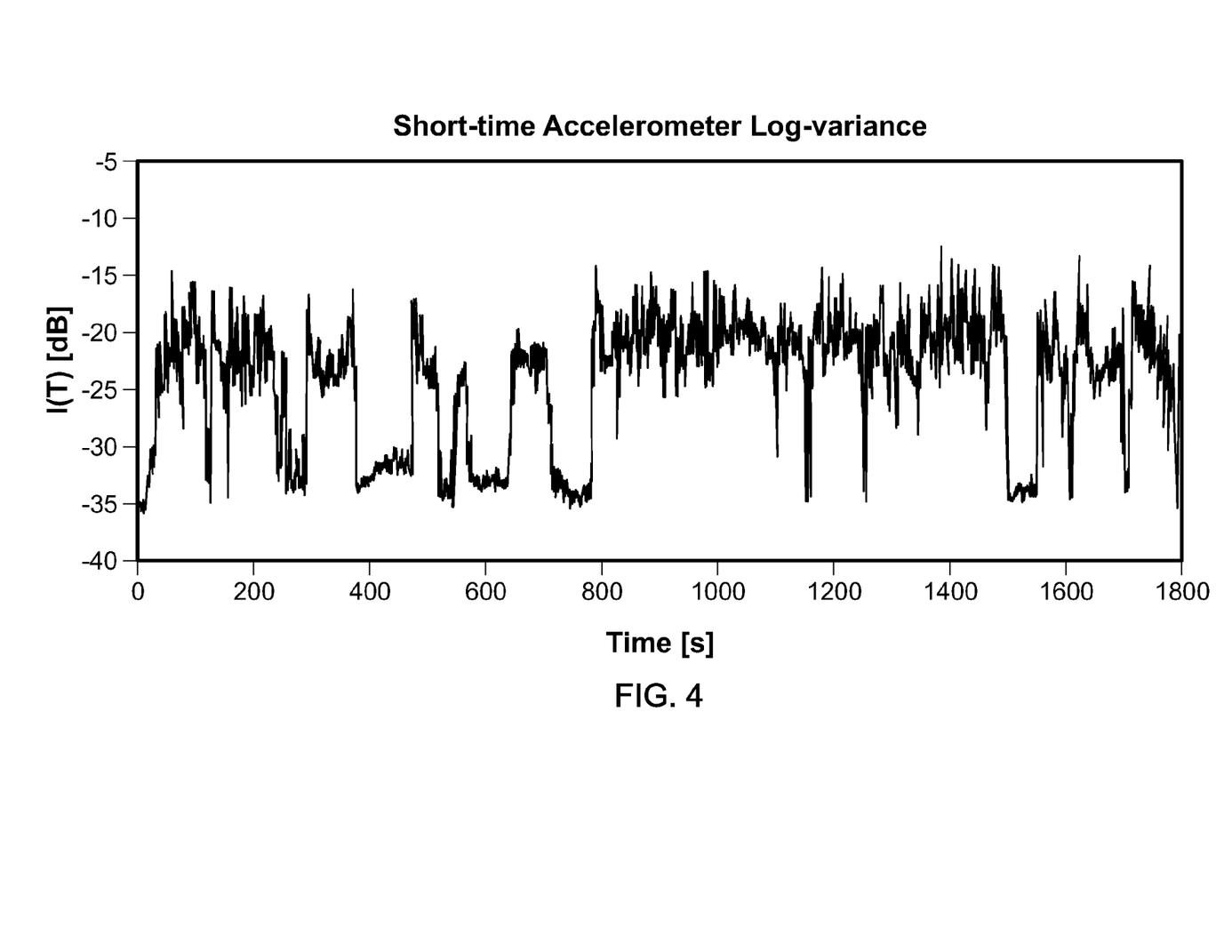
FIG. 4 is a time series plot of a short-time log-variance signal recorded by a mobile device mounted inside a vehicle during a field test drive.
Figure 5:
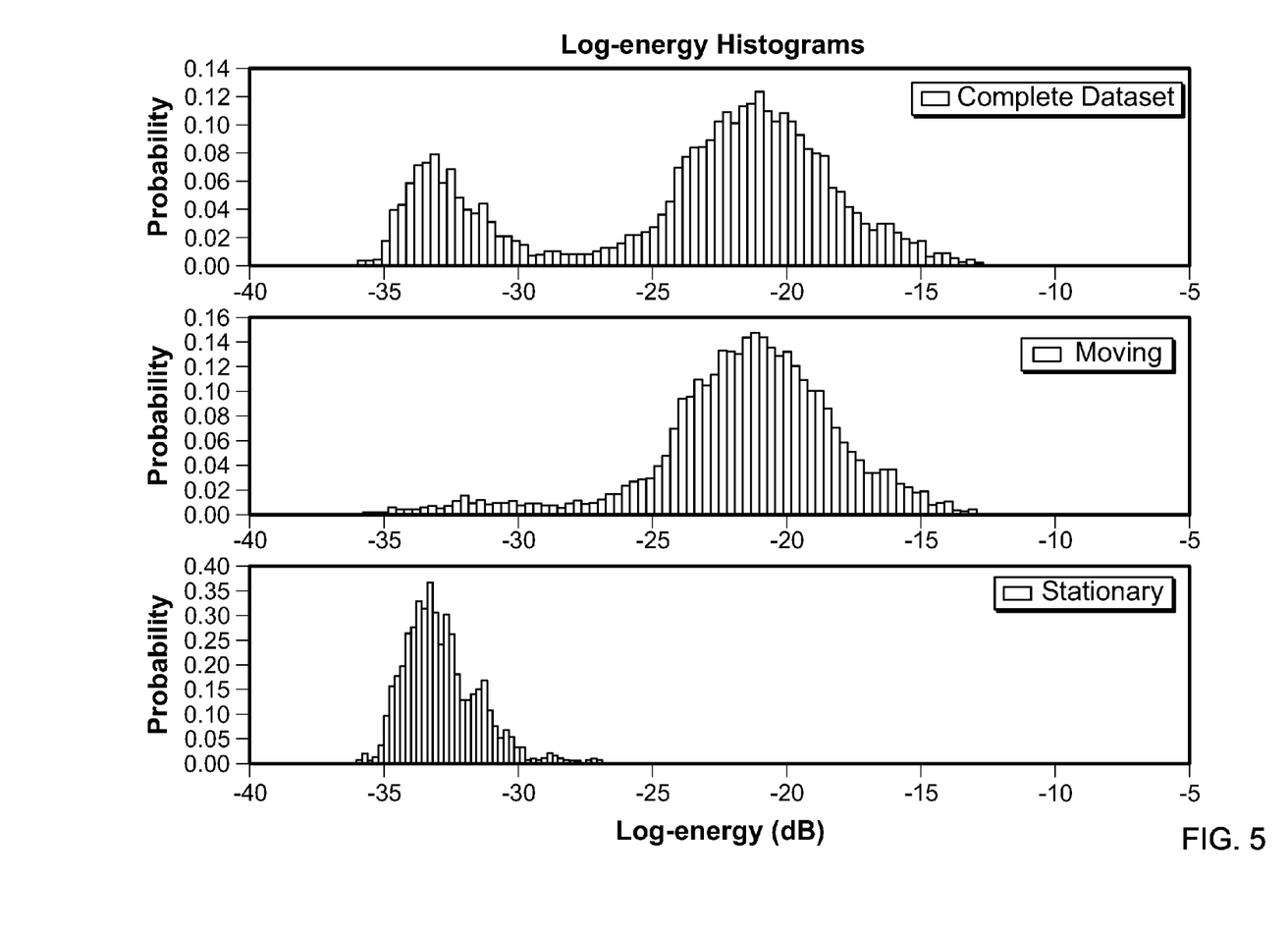
FIG. 5 shows a histogram analysis of the log-variance data of the signal shown in FIG. 4.

FIG. 4 is a time series plot of a short-time log-variance signal recorded by a mobile device mounted inside a vehicle during a field test drive. FIG. 5 shows a histogram analysis of the same log-variance data. Note how the histogram of the dataset has a prominent bimodal log-normal distribution. Since the accelerometer data was captured along with the ground truth movement state of the vehicle (an INS system was used to determine if the vehicle was moving or stationary), the data can be broken into two parts. The top plot shows all the data record during the test drive (the complete dataset). The middle plot of shows the data recorded while the vehicle was moving. The bottom plot shows the data recorded during stationary periods.

Each subset has an approximate log-normal distribution, with the fit being significantly better for the stationary dataset show in the bottom plot. The distribution of the moving data set appears to have longer tails. This is probably related to the fact that there are a larger variety of ways in which a vehicle can be moving, where as there is only one way in which a vehicle can be stationary.

The stationary dataset has a lower mean value (−33 dB) and smaller standard deviation than the moving dataset. The highly separable bimodal nature of the data distribution will allow the construction of a threshold based classifier (e.g., activity state classifier 204) that can be used to tag the sensor data as either stationary or moving (the activity state).

Figure 6:
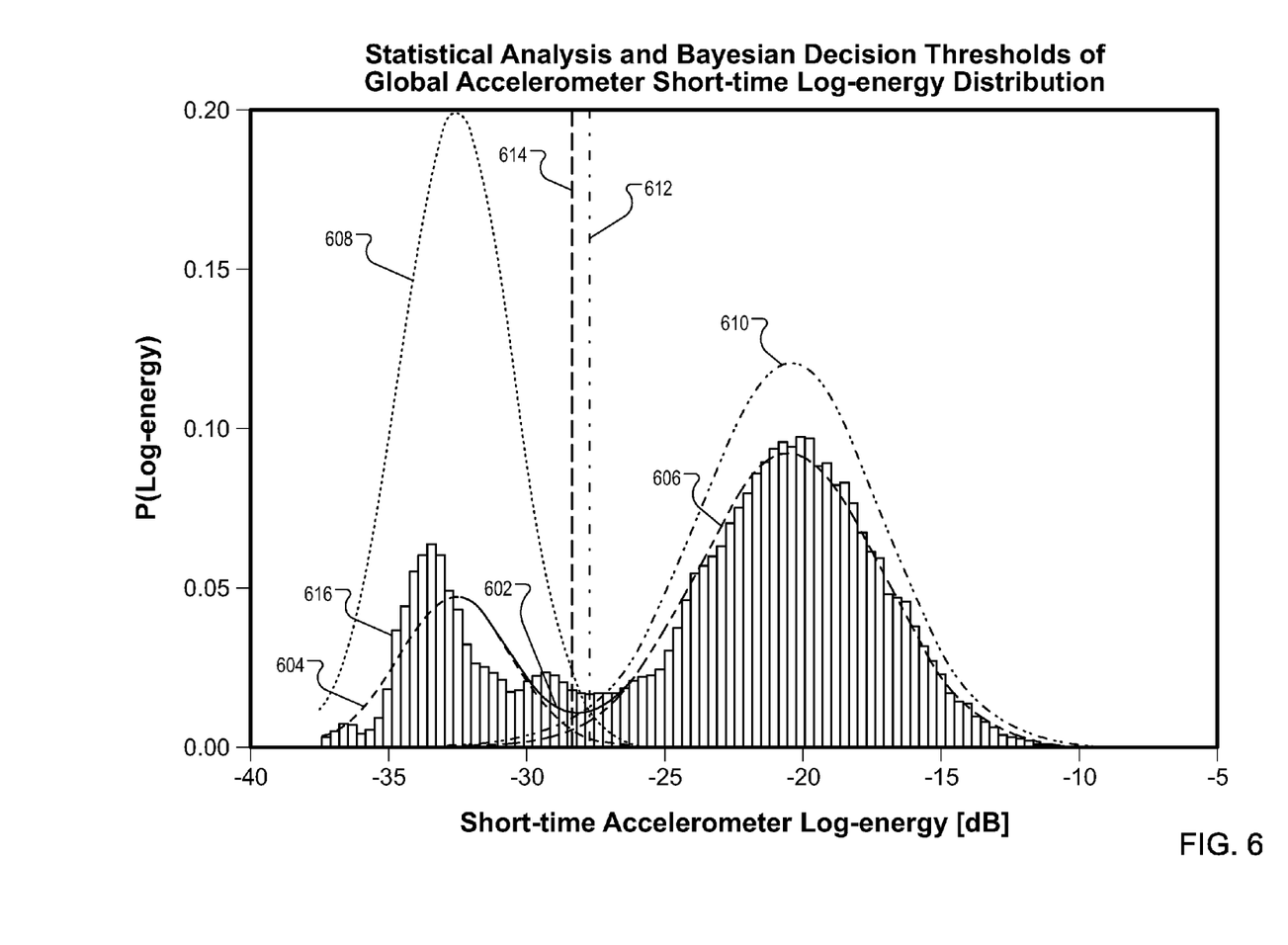
FIG. 6 is a graph illustrating short-time accelerometer log-energy (dB).

FIG. 6 is a plot showing a statistical analysis of accelerometer short-time log-energy data (dB). The plot shows a global posteriori probability density function (pdf) 602, a stationary pdf (MAP) 604, a moving pdf (MAP) 606, a stationary pdf (ML) 608, moving pdf (ML) 610, ML decision threshold 612, MAP decision threshold 614 and global accelerometer log-energy histogram 616.

FIG. 6 shows and compares the results of fitting two different parametric models to the bimodal histogram. A first model is a simple maximum likelihood (ML) fitting of two separate Gaussian models to the two modes of the distribution. The inner intersection point of these two models is the ML decision threshold 612. An accelerometer log-variance measurement that is below the ML decision threshold is classified as stationary. An accelerometer log-variance signal that is above the ML decision threshold is classified as moving.

A second model uses an expectation-maximization (EM) algorithm to fit a full Gaussian mixture model to the complete dataset. This model combines component priors with the individual likelihood terms to allow for a Bayesian maximum a posteriori (MAP) decision threshold 614. The EM algorithm is described in T. Moon, "The expectation-maximization algorithm," *IEEE Signal Processing magazine*, vol. 13, no. 6, pp. 47-60, 1996.

Example Process

A global ML or MAP model can be trained and used as a discriminative threshold based binary classifier. This procedure may require access to a large representative dataset containing data captured during both stationary and moving periods. Further, such a global model is fitted once to the available data and then used in a fixed (non-adaptive) fashion. This assumes that the statistics of the different regimes (moving/stationary) of the signal do not change over time. However, an analysis of a variety of different datasets has indicated a significant amount of non-stationarity in the signal statistics over time. This drift can make a non-adaptive algorithm less robust. Given these observations, a process that can adapt to slow changes in the signal statistics is preferable.

Another observation that informed the design of the disclosed classification process is the difference in the goodness-of-fit (to log-normal distribution) of the component parts of the bimodal distribution of FIG. 5. As previously mentioned, the stationary component (lower mode) is better modeled as a single Gaussian probability density function than the heavier tailed and asymmetric moving component (higher mode).

Based on these observations, an example process for an activity state classifier has the following characteristics:

1. Only model the stationary mode of the log-variance histogram using a single Gaussian probability density function.
2. Adapt the statistics (mean and variance) of the stationary model only when the current measurements are classified as "stationary."
3. Provide a binary "stationary/not-stationary" classification of the signal using a decision threshold derived from the local (in time) stationary model statistics.

Example Design and Implementation

Figure 7:
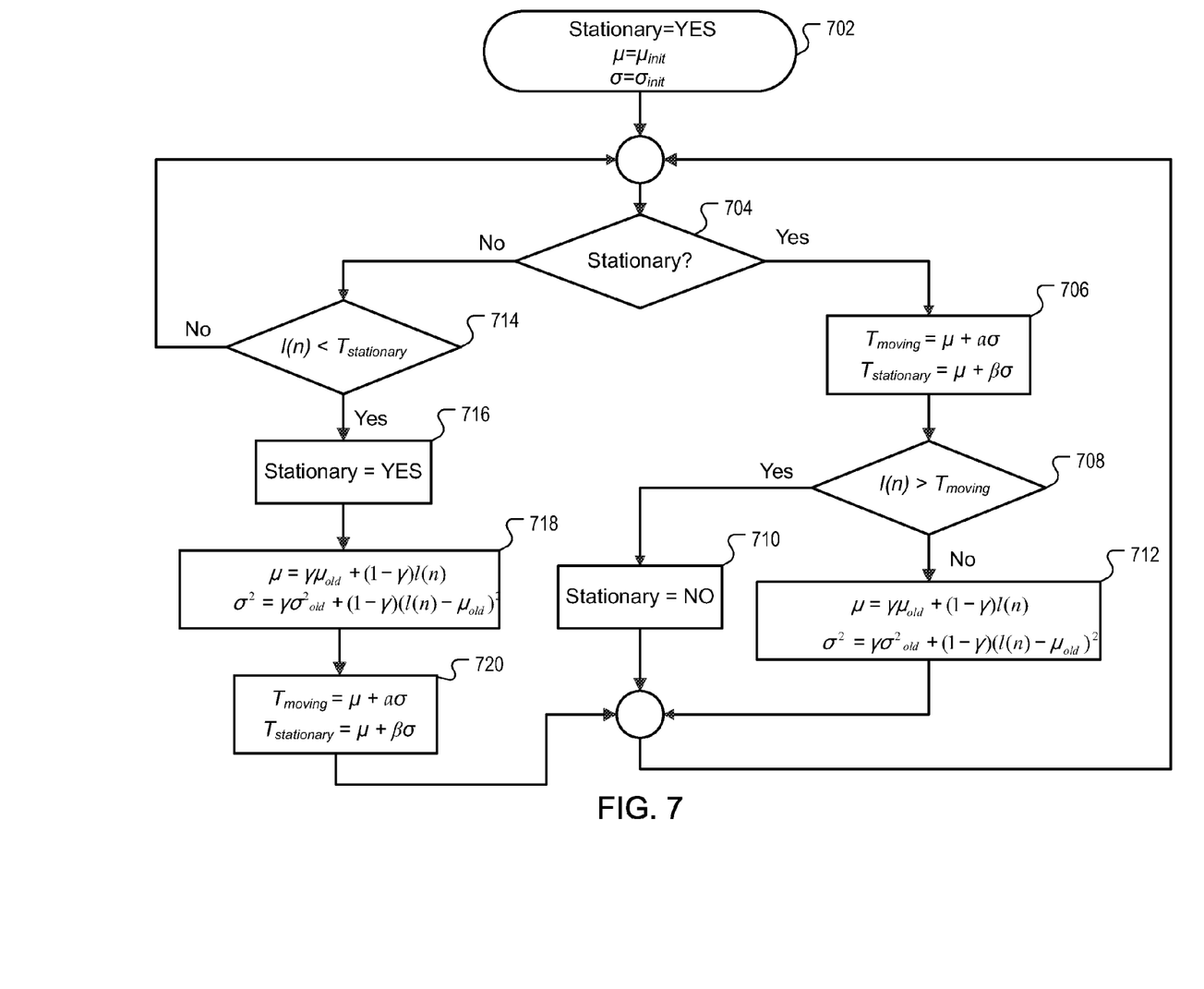
FIG. 7 is a flow diagram of an example process for adaptive-based activity classification.

FIG. 7 is a flow diagram of an example process 700 for adaptive-based activity classification. The process 700 can begin by initializing, $\mu=\mu_{init}$ and $\sigma=\sigma_{init}$ (702), where $\mu$ and $\sigma$ are the mean and standard deviation, respectively, of the current estimate of the stationary mode Gaussian probability density function. Also, a variable indicating the activity state of the device can be initialized. In this example, "stationary=YES" when the device is stationary and "stationary=NO" when the device is moving. In step (702), "stationary" is initially set to "YES."

Next, process 700 determines (704) if the device is stationary. If the device is stationary (stationary=YES), then a movement onset threshold and a stationary threshold are calculated (708). In some implementations, the movement onset threshold is given by $$T_{moving}=\mu+\alpha\sigma, \qquad [5]$$

and, the stationary threshold is given by $$T_{stationary}=\mu+\beta\sigma. \qquad [6]$$

Optimal values for $\alpha$ and $\beta$ can be found through experimental cross-validation. Typical values for these parameters are: $1 \leq \beta \leq \alpha \leq 3$. With $\alpha > \beta$, an onset/cessation hysteresis band is effective. This might prove useful in certain cases to reduce spurious classification flipping during a transition.

If process 700 determines (708) that the short time log-variance signal is greater than the movement onset threshold $(l(n) > T_{moving})$, the estimates of $\mu$ and $\sigma$ are not updated, stationary is set to "NO" (710), and process 700 returns to step (704). Otherwise, a new or updated mean and variance of the stationary Gaussian probability density function are calculated (712) and process 700 returns to step (704). In some implementations, the new or updated mean and variance are given by $$\mu=\gamma\mu_{old}+(1-\gamma)l(n), \text{ and} \qquad [7]$$

$$\sigma^2=\gamma\sigma^2_{old}+(1-\gamma)(l(n)-\mu_{old})^2 \qquad [8]$$

where $0<\gamma<1$. A typical value for $\gamma$ is 0.999.

If process 700 determines (704) that the device is not stationary ("stationary"=NO), and if process 700 determines (714) that the short time log-variance signal is less than the stationary threshold $(l(n) < T_{stationary})$, then stationary is set to "YES" (716) and a new or updated mean and variance of the stationary Gaussian probability density function are calculated (718) using, for example, equations [7] and [8], a new movement onset threshold and stationary threshold are calculated (720) based on the updated mean and variance, and process 700 returns to step (704).

If at step (714), process 700 determines (714) that that the short time log-variance signal is not less than the stationary threshold, then process 700 returns to step (704).

The process 700 can be summarized in the following pseudo-code.

```
# Initialize variables
stationary = True
mu = mu__init
sigma = sigma__init
# Process incoming log-variance data...
for x in logVar:
    if stationary:
        Tmove = mu + alpha * sigma
        Tstat = mu + beta*sigma
        if (x > Tmove):
            stationary = False;
        else
            sigma = sqrt (gamma*sigma**2 + (1-gamma)*(x-mu)**2)
            mu = gamma*mu + (1-gamma)*x
    else : # non-stationary
        if (x < Tstat) :
            stationary = True
            sigma = sqrt(gamma*sigma**2 +
            (1-gamma)*(x-mu)**2)
            mu = gamma*mu + (1-gamma)*x
            Tmove = mu + alpha* sigma
            Tstat = mu + beta*sigma
```

Example Process Initialization

Event though the process 700 as disclosed is capable of tracking slowly varying local statistics of the accelerometer measurements, the process 700 should be initialized with values for the mean and standard deviation parameters. If the device is started in a known (stationary) state, the initial model parameters for mean and standard deviation can be set (calibrated) through a simple ML estimation procedure using the initial log-variance measurements.

If the initial state of the system is unknown, a cold start initialization procedure can be used. This approach builds up a fading-memory histogram of accelerometer log-variance measurements over time. The top plot of FIG. 5 shows what such a histogram will look like. Once a bimodal structure with a large enough separation between the two modal peaks can be inferred from the histogram, the position of the lower modal peak is used as the initial value for the mean.

Alternatively, a two component Gaussian mixture model can be fitted to the histogram at discrete time intervals using a sequential EM algorithm, as described in G. McLachlan and T. Krishnan, The EM Algorithm and Extensions. Wiley, 1997. Once a goodness-of-fit crosses a given threshold, the fitted stationary component can be used to initialize the mean and standard deviation. Some examples of techniques for determining goodness-of-fit are described in R. V. Hogg and E. A. Tanis, Probability and statistical inference. Prentice-Hall, 5 ed., 1997 and H. Akaike, "A new look at the statistical model identification," *IEEE Transactions on Automatic Control,* vol. 19, no. 6, pp. 716-723, 1974.

A bootstrap approach can also be used that relies on other sensor information to assert the initial movement state of the device. For example, GPS velocity measurements can be used to determine if the mobile device is moving slower than a certain threshold velocity.

Some example initial parameter values are as follows:

TABLE I

Example Initial Parameter Values

| | |
|---|---|
| $\alpha$ | 2.0 |
| $\beta$ | 1.5 |
| $\mu_{init}$ | −33.0 dB |
| $\sigma_{init}$ | 3.0 dB |
| $\gamma$ | 0.999 |
| $\tau$ | 2 seconds |
| $\Delta T$ | 1/66 second |

Example Process Stability and Reset

Since the disclosed activity state classifier is an adaptive process, the estimated model parameters should be monitored to ensure process stability. In some implementations, the range to which the process is allowed to modify the mean and standard deviation can be limited. This range can be determined empirically by looking at the ensemble statistics of a large number of data sets. Continually updating and monitoring a fading-memory histogram of accelerometer log-variance measurements over time can also be an online sanity check. If instability is detected in the form of significant deviation between the histogram statistics and the classifier model parameters, the process can be reset using the histogram to infer the new initial parameter values.

Example Navigation System

Figure 8:
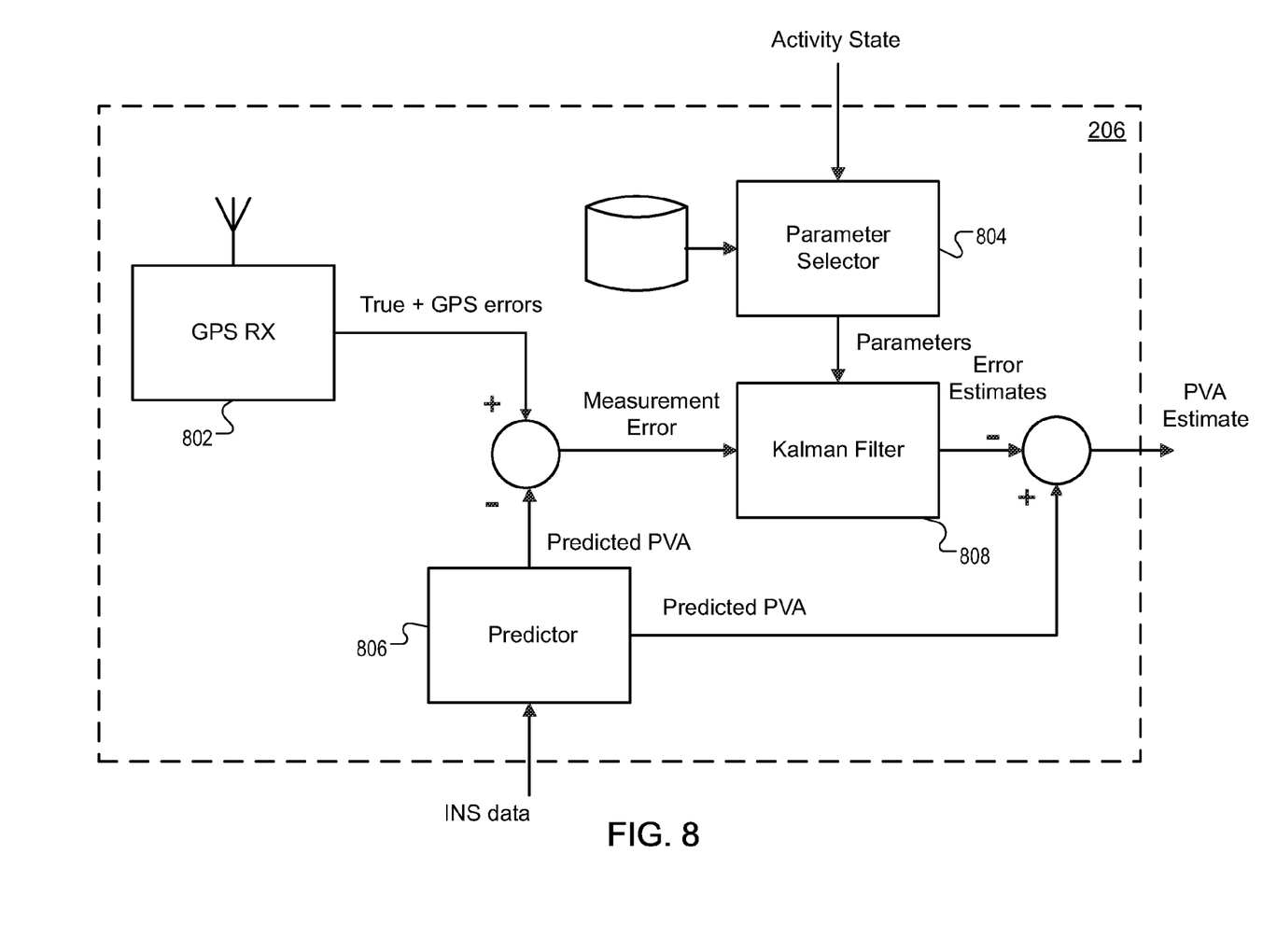
FIG. 8 is a block diagram of an example navigation engine that uses an activity state to improve a navigation solution.

FIG. 8 is a block diagram of an example navigation engine 206 that uses an activity state to improve a navigation solution. In some implementations, activity states can be used in a loosely coupled or tightly coupled GPS/INS architecture in a mobile device. Navigation engine 206 can be included in one or more IC chips of a mobile device. In some implementations, navigation engine 206 can include GPS receiver (RX) 802, parameter selector 804, predictor 806 and Kalman filter 808. Other configurations are possible, including configurations with more or fewer components or subsystems.

Kalman filter 808 is a linear, recursive estimator that produces a minimum variance estimate in a least squares sense under the assumption of white, Gaussian noise processes. Kalman filter 808 estimates errors in a navigation state (e.g., position, velocity, acceleration, heading) of a mobile device, and produces a measure of accuracy of its error state vector estimate, referred to as a covariance matrix. Kalman filter 808 weighs relative contributions of measurements of the navigation state and the dynamic behavior of the navigation state. The measurements and navigation state vector are weighted by their respective covariance matrices. If the measurements are inaccurate (large variances) when compared to the navigation state estimate, then Kalman filter 808 will de-weight the measurements. If the measurements are accurate (small variances) when compared to the navigation state estimate, then Kalman filter 808 will weight the measurements heavily with the consequence that its previously computed navigation state estimate will contribute little to the previous navigation state estimate.

In some implementations where inertial navigation system (INS) data is available (e.g., accelerometer output), predictor 806 can use the INS data to calculate a predicted navigation state. The predicted navigation state can be subtracted from the navigation state provided by GPS receiver 802 to generate measurement error. The measurement error is provided as input to Kalman filter 808. If an activity state is not available, Kalman filter 808 can compute filter weights according to well-known Kalman filter equations described below. If an activity state is available, parameter selector 804 will select parameters for that activity state from a database 810 of parameters. The selected parameters can be used by internal Kalman processes to predict more accurate error estimates than would be possible without external knowledge of the activity state of the device. The improved error estimates can be subtracted from a predicted navigation state to provide a more accurate navigation state estimate.

For example, if an activity state indicates that a mobile device (e.g., a mobile phone including a GPS receiver) is not moving or stationary, then a set of parameters can be selected by parameter selector 804 that cause a current estimate of position to contribute little or nothing to a previous estimate of position. Similarly, if an activity state indicates that the mobile device is not turning (e.g., based on a magnetometer or gyroscope reading), then a set of parameters can be selected by parameter selector 804 that cause a current estimate of heading or attitude to contribute little or nothing to a previous estimate of heading or attitude.

Example State Estimation Process

Figure 9:
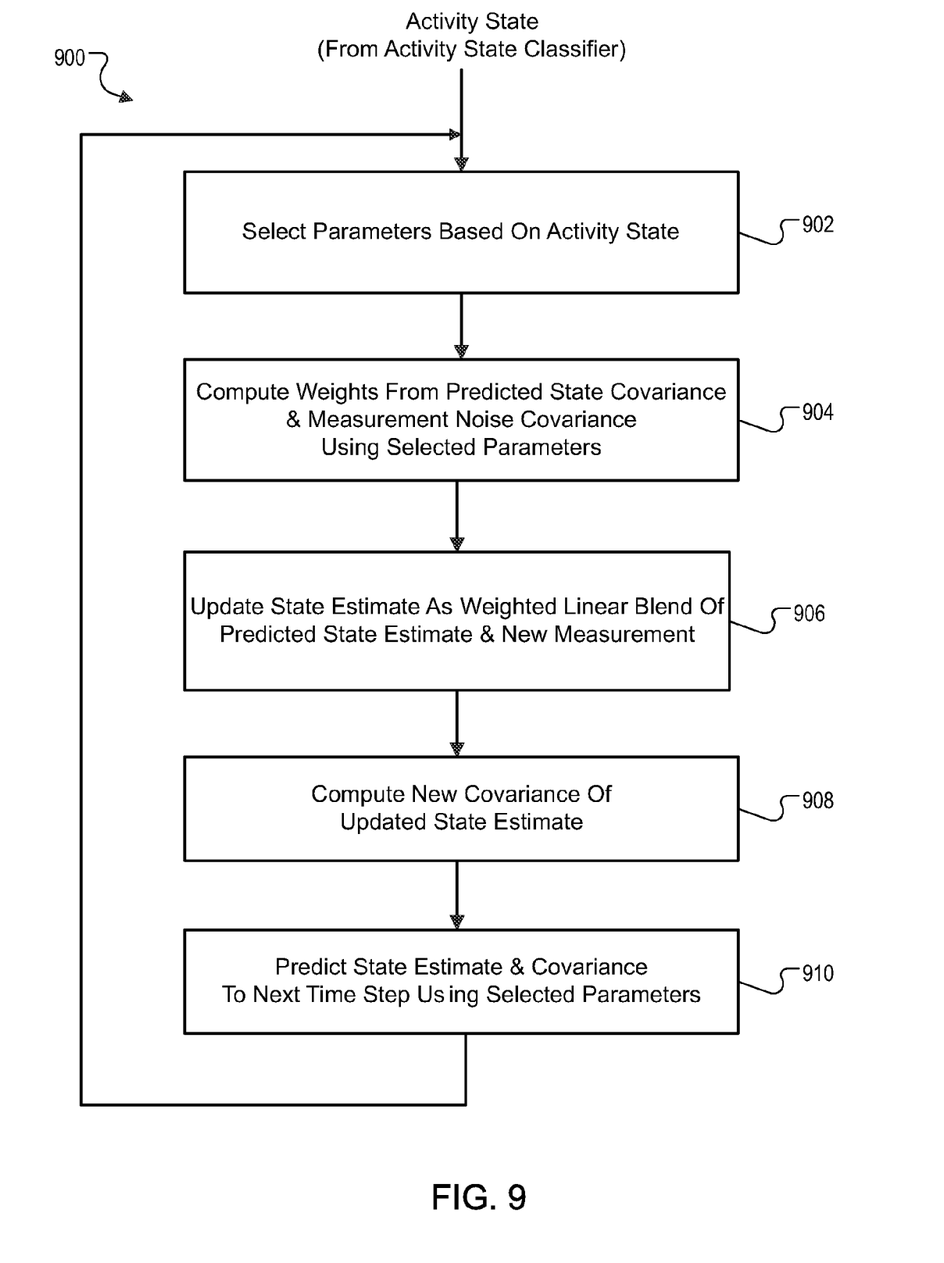
FIG. 9 is a flow diagram of an example navigation state estimation process that uses an activity state to improve a navigation solution.

FIG. 9 is a flow diagram of an example state estimation process 900 that uses an activity state to improve a navigation solution. For convenience, process 900 will be described in reference to navigation engine 206. The steps of process 900 need not occur sequentially or in the order described below.

Process 900 can begin by getting activity state. The activity state can be generated by activity state classifier 204 in response to receiving output from one or more sensors 202. Kalman filter parameters are selected or calculated based on the activity state (902). In some implementations, the parameters can be determined empirically based on simulation.

After the parameters are either selected or computed, filter gains are calculated using the selected parameters (904). The state estimate is updated as a weighted linear blend of the predicted state estimate and a new measurement (906). A new covariance of the updated state estimate is computed (908). The state estimate and covariance is predicted to a next time step using a state transition matrix and the selected parameters (910). Process 900 can then return to step 902.

Equations for a linear, discrete Kalman filter are given by

1. Gain Computation $K_k = P_{k/k-1} H_k^T [H_k P_{k/k-1} H_k^T + R_k]^{-1}$,      [10]

2. Update Estimate $x_{k/k} = x_{k/k-1} + [K_k \text{ or } KCB_k][z_k H_k x_{k/k-1}]$,      [11]

3. Update Covariance $P_{k/k} = [-K_k H_k] P_{k/k-1}$,      [12]

4. Prediction $x_{k+1/k} = \Phi_k x_{k/k}$ $$P_{k+1/k} = \Phi_k P_{k/k} \Phi_k^T Q_k' \quad [13]$$

where P is a state covariance matrix, R is a measurement covariance matrix, $\Phi$ is a state transition matrix and Q is a process noise matrix. Equations 10-13 can be used to implement process 900 in a digital computer. If an activity state is available, then [10] and/or [13] can use the selected parameters to augment measurement and/or process noise. In some implementations, one or more of the Kalman matrix K, process noise matrix Q and measurement covariance matrix R can be modified by the parameters selected in step 902 of process 900.

In some implementations, the activity state can be used to adjust how location information (e.g., GPS data) is displayed to a user on, for example, a map view. For example, if at a particular time motion of a mobile device is classified as "stationary," and GPS data (e.g., velocity) indicates that the device is moving, then an icon or marker representing the current location of the mobile device can be held at its current position. Similarly, if the mobile device is classified as "not turning" and magnetometer or gyroscope data indicate that the device is turning, then the icon or marker can be held at its current orientation. Accordingly, in some implementations, the GPS data can be ignored for display purposes when an activity state contradicts the GPS data or data from other sensors.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, e.g., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more processors of a mobile device for determining an activity state of the mobile device, the method comprising:
   calculating a movement onset threshold based on a statistical model of sensor measurements for a motion sensor of the mobile device, where the statistical model is a stationary mode of a separable log-normal distribution of a short-time variance of the sensor measurements;
   receiving a first set of measurements from the motion sensor;
   calculating a log-variance signal based on the first set of measurements;
   comparing the log-variance signal with the movement onset threshold; and
   determining that the log-variance signal exceeds the movement onset threshold.

2. The method of claim 1, further comprising:
   calculating a stationarity threshold based on the statistical model;
   receiving a second set of measurements from the motion sensor;
   updating the log-variance signal based on the second set of measurements;
   determining that the updated log-variance signal does not exceed the stationary threshold; and
   updating the statistical model using the set of measurements.

3. The method of claim 2, further comprising:
   generating an activity state indicating that the mobile device is stationary; and
   generating a navigation solution using the activity state.

4. The method of claim 2, where updating the statistical model includes updating a mean and variance of the stationary mode of the separable log-normal distribution.

5. The method of claim 4, where the log-variance signal is given by $$l(n) = 10 log_{10}\left(\frac{1}{N}\sum_{k=0}^{N-1}(a_x(n-k)-\mu_x)^2 + \frac{1}{N}\sum_{k=0}^{N-1}(a_y(n-k)-\mu_y)^2 + \frac{1}{N}\sum_{k=0}^{N-1}(a_z(n-k)-\mu_z)^2\right),$$

where $a_x(n)$, $a_y(n)$ and $a_z(n)$ are linear accelerometer measurements at time n along x, y, z axes of a local inertial coordinate frame, respectively, N is a window length in samples over which the log-variance signal is calculated, and $\mu_x$, $\mu_y$, $\mu_z$ are short-time signal mean values for the x, y, z axes.

6. The method of claim 5, where the short time signal mean values $\mu_x$, $\mu_y$, $\mu_z$ are given by $$\mu_x = \frac{1}{N}\sum_{k=0}^{N-1}a_x(n-k),$$

$$\mu_y = \frac{1}{N}\sum_{k=0}^{N-1}a_y(n-k),$$

$$\mu_z = \frac{1}{N}\sum_{k=0}^{N-1}a_z(n-k).$$

7. The method of claim 6, where the movement onset threshold is given by $$T_{moving} = \mu + \alpha\sigma,$$

where $\mu$ and $\sigma$ are a mean and standard deviation, respectively, of a current estimate of a stationary mode Gaussian probability density function and $\alpha$ reduces spurious classification.

8. The method of claim 7, where updating the statistical model movement onset threshold is given by $$T_{stationary} = \mu + \beta\sigma,$$

where $\mu$ and $\sigma$ are a mean and standard deviation, respectively, of a current estimate of a stationary mode Gaussian probability density function and $\beta$ reduces spurious classification.

9. The method of claim 8, wherein the mean and variance are updated using the following expressions:

$$\mu_{new} = \gamma\mu_{old} + (1-\gamma)l(n),$$

$$\sigma^2_{new} = \gamma\sigma^2_{old} + (1-\gamma)(l(n)-\mu_{old})^2,$$

where l(n) is a log-variance and $\gamma$ is a weighting factor.

10. The method of claim 1, further comprising:
    generating an activity state indicating that the mobile device is moving; and
    generating a navigation solution based on the activity state.

11. The method of claim 1, where the measurements are acceleration measurements.

12. A system for determining an activity state of a mobile device, comprising:
    a motion sensor;
    a processor coupled to the sensor and operable for:
       calculating a movement onset threshold based on a statistical model of sensor measurements for a motion sensor of the mobile device, where the statistical model is a stationary mode of a separable log-normal distribution of a short-time variance of the sensor measurements;

receiving a first set of measurements from the motion sensor;

calculating a log-variance signal based on the first set of measurements;

comparing the log-variance signal with the movement onset threshold; and determining that the log-variance signal exceeds the movement onset threshold.

13. The system of claim 12, where the processor is operable for:

calculating a stationary threshold based on the statistical model;

receiving a second set of measurements from the motion sensor;

updating the log-variance signal based on the second set of measurements;

determining that the updated log-variance signal does not exceed the stationary threshold; and updating the statistical model using the set of measurements.

14. The system of claim 13, where the processor is operable for:

generating an activity state indicating that the mobile device is stationary; and generating a navigation solution using the activity state.

15. The system of claim 13, where updating the statistical model includes updating a mean and variance of the stationary mode of the separable log-normal distribution.

16. The system of claim 15, where the log-variance signal is given by $$l(n) = 10 log_{10}\left(\frac{1}{N}\sum_{k=0}^{N-1}(a_x(n-k)-\mu_x)^2 + \frac{1}{N}\sum_{k=0}^{N-1}(a_y(n-k)-\mu_y)^2 + \frac{1}{N}\sum_{k=0}^{N-1}(a_z(n-k)-\mu_z)^2\right),$$

where $a_x(n)$, $a_y(n)$ and $a_z(n)$ are linear accelerometer measurements at time n along x, y, z axes of a local inertial coordinate frame, respectively, N is a window length in samples over which the log-variance signal is calculated, and $\mu_x$, $\mu_y$, $\mu_z$ are short-time signal mean values for the x, y, z axes.

17. The system of claim 16, where the short time signal mean values $\mu_x$, $\mu_y$, $\mu_z$ are given by $$\mu_x = \frac{1}{N}\sum_{k=0}^{N-1} a_x(n-k),$$

$$\mu_y = \frac{1}{N}\sum_{k=0}^{N-1} a_y(n-k),$$

$$\mu_z = \frac{1}{N}\sum_{k=0}^{N-1} a_z(n-k).$$

18. The system of claim 17, where the movement onset threshold is given by $$T_{moving} = \mu + \alpha\sigma,$$

where $\mu$ and $\sigma$ are a mean and standard deviation, respectively, of a current estimate of a stationary mode Gaussian probability density function and a reduces spurious classification.

19. The system of claim 18, where updating the statistical model movement onset threshold is given by $$T_{stationary} = \mu + \beta\sigma,$$

where $\mu$ and $\sigma$ are a mean and standard deviation, respectively, of a current estimate of a stationary mode Gaussian probability density function and $\beta$ reduces spurious classification.

20. The system of claim 19, wherein the mean and variance are updated using the following expressions:

$$\mu_{new} = \gamma\mu_{old} + (1-\gamma)l(n),$$

$$\sigma^2_{new} = \gamma\sigma^2_{old} + (1-\gamma)(l(n)-\mu_{old})^2,$$

where l(n) is a log-variance and $\gamma$ is a weighting factor.

21. The system of claim 12, where the processor is operable for:

generating an activity state indicating that the mobile device is moving; and generating a navigation solution based on the activity state.

22. The system of claim 12, where the measurements are acceleration measurements.

* * * * *

UNITED STATES PATENT AND TRADEMARK OFFICE
CERTIFICATE OF CORRECTION

PATENT NO.        : 8,374,775 B2                               Page 1 of 1
APPLICATION NO.   : 12/613438
DATED             : February 12, 2013
INVENTOR(S)       : Rudolph van der Merwe It is certified that error appears in the above-identified patent and that said Letters Patent is hereby corrected as shown below:

Title page, col. 2, OTHER PUBLICATIONS, line 13, delete "identication" and insert
-- identification --.

In the Claims:

Col. 16, line 21, in claim 18, delete "a" and insert -- α --.

Signed and Sealed this
Twenty-first Day of May, 2013

Teresa Stanek Rea
*Acting Director of the United States Patent and Trademark Office*